(12) United States Patent
Zhang et al.

(10) Patent No.: US 9,267,041 B2
(45) Date of Patent: Feb. 23, 2016

(54) ANTI-CORROSION AND/OR PASSIVATION COMPOSITIONS FOR METAL CONTAINING SUBSTRATES AND METHODS FOR MAKING, ENHANCING, AND APPLYING THE SAME

(71) Applicant: Goodrich Corporation, Charlotte, NC (US)

(72) Inventors: Weilong Zhang, Glastonbury, CT (US); Michael A. Kryzman, West Hartford, CT (US); Georgios S. Zafiris, Glastonbury, CT (US); Mark R. Jaworowski, Glastonbury, CT (US); Roque Panza-Giosa, Oakville (CA); Marilea Manzini, Maple (CA)

(73) Assignee: GOODRICH CORPORATION, Charlotte, NC (US)

( * ) Notice: Subject to any disclaimer, the term of this patent is extended or adjusted under 35 U.S.C. 154(b) by 33 days.

(21) Appl. No.: 14/316,123

(22) Filed: Jun. 26, 2014

(65) Prior Publication Data

US 2015/0274984 A1    Oct. 1, 2015

Related U.S. Application Data

(60) Provisional application No. 61/971,993, filed on Mar. 28, 2014.

(51) Int. Cl.

| | | |
|---|---|---|
| *B64C 25/00* | (2006.01) | |
| *B32B 15/04* | (2006.01) | |
| *C09D 5/08* | (2006.01) | |
| *C09D 109/00* | (2006.01) | |
| *C09D 133/00* | (2006.01) | |
| *C09D 163/00* | (2006.01) | |
| *C09D 167/08* | (2006.01) | |
| *C09D 175/04* | (2006.01) | |
| *C09D 181/04* | (2006.01) | |
| *C09D 183/04* | (2006.01) | |
| *C23F 11/18* | (2006.01) | |
| *C08K 3/08* | (2006.01) | |
| *C08K 3/22* | (2006.01) | |
| *C08K 3/34* | (2006.01) | |
| *C08K 5/3432* | (2006.01) | |

(52) U.S. Cl.
CPC ... *C09D 5/08* (2013.01); *C08K 3/08* (2013.01); *C08K 3/22* (2013.01); *C08K 3/34* (2013.01); *C08K 5/3432* (2013.01); *C09D 5/084* (2013.01); *C23F 11/187* (2013.01); *C08K 2003/2255* (2013.01)

(58) Field of Classification Search
None
See application file for complete search history.

(56) References Cited

U.S. PATENT DOCUMENTS

| | | | |
|---|---|---|---|
| 3,969,127 A | | 7/1976 | Robitaille et al. |
| 4,040,842 A | * | 8/1977 | Makishima ............... C09D 5/08 106/1.17 |
| 5,059,640 A | * | 10/1991 | Hegedus ............ C08G 18/4236 523/451 |
| 5,089,551 A | | 2/1992 | Hegedus et al. |
| 5,266,611 A | | 11/1993 | Teschendor |
| 5,938,861 A | * | 8/1999 | Inoue ....................... C23C 22/34 148/247 |
| 6,139,616 A | * | 10/2000 | Nagayama ............. C01G 9/006 106/14.05 |
| 6,537,678 B1 | | 3/2003 | Putnam et al. |
| 2004/0104378 A1 | * | 6/2004 | Bhatia .................. C09D 163/00 252/389.54 |
| 2006/0247335 A1 | * | 11/2006 | Bhaatia .................. C09D 5/002 523/458 |

FOREIGN PATENT DOCUMENTS

| | | |
|---|---|---|
| EP | 0902103 | 3/1999 |
| EP | 2011899 | 1/2009 |
| GB | 704861 | 3/1954 |
| WO | 2008090411 | 7/2008 |

OTHER PUBLICATIONS

Notice of Allowance dated Sep. 28, 2015 in U.S. Appl. No. 14/316,403.
Corrected Notice of Allowability dated Oct. 14, 2015 in U.S. Appl. No. 14/316,403.
Extended European Search Report dated Aug. 10, 2015 in European Application No. 15160532.6.
Extended European Search Report dated Aug. 10, 2015 in European Application No. 15160635.7.
Blustein et al., "Zinc basic benzoate as eco-friendly steel corrosion inhibitor pigment for anticorrosive epoxy-coatings," Colloids & Surfaces A, Physicachemical and Engineering Aspects, Elsevier, Amsterdam, NL, col. 290, No. 1-3, Nov. 15, 1996, pp. 7-18.
John Sinko, "Challenges of chromate inhibitor pigments replacement in organic coatings," Progress in Organic Coatings, col. 42, No. 3-4, Sep. 2001, pp. 267-282.
Hamlaoui et al., "Corrosion behaviour of molybdate-phosphate-silicate coatings on galvanized steel," Corrosion Science, Oxford, GB, vol. 51, No. 10, Oct. 2009, pp. 2455-2462.

* cited by examiner

*Primary Examiner* — Michael J Feely
(74) *Attorney, Agent, or Firm* — Snell & Wilmer L.L.P.

(57) ABSTRACT

A corrosion inhibition composition is disclosed comprising a cerium, a silicate compound, and a molybdate compound. Moreover, a corrosion inhibition composition is disclosed comprising a cerium, a silicate compound, a tungstate and a molybdate compound.

19 Claims, 6 Drawing Sheets

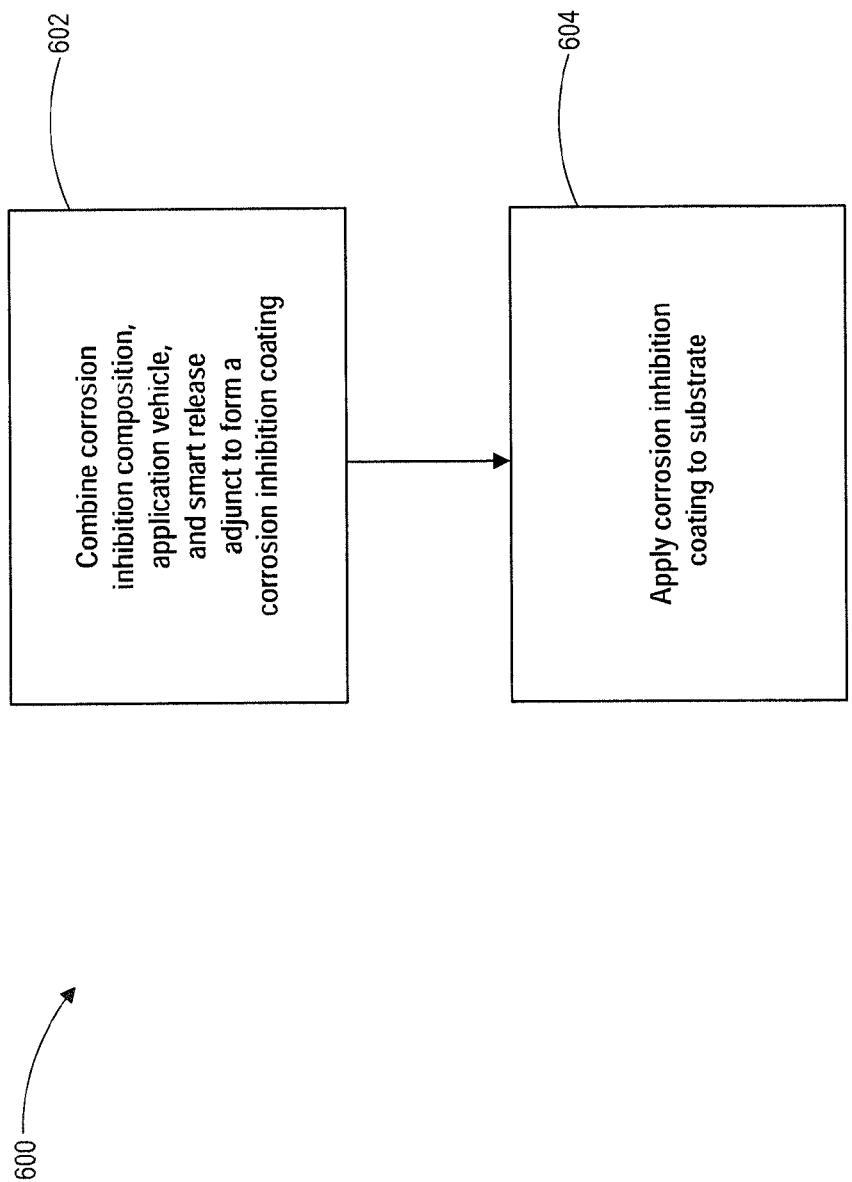

ANTI-CORROSION AND/OR PASSIVATION COMPOSITIONS FOR METAL CONTAINING SUBSTRATES AND METHODS FOR MAKING, ENHANCING, AND APPLYING THE SAME

CROSS REFERENCE TO RELATED APPLICATIONS

This application claims priority to and is a nonprovisional application of U.S. Provisional Patent Application Ser. No. 61/971,993 entitled "'Smart release' anti-corrosion pigment compositions and preparation methods for Zn—Ni coated metal substrates" and filed on Mar. 28, 2014, the contents of which are hereby incorporated by reference in their entirety.

BACKGROUND

Conventionally, high-performance post-treatments for electroplating metal and metal coated substrates (e.g., zinc-nickel coatings on high strength low alloy steel) are currently based on hexavalent chromate chemistry. Hexavalent chromium is highly toxic and a known carcinogen. Therefore, an alternative to chromate post-treatment may be beneficial.

SUMMARY

Various compositions, systems, and methods are disclosed herein. In various embodiments, a corrosion inhibition composition is disclosed comprising a cerium, a silicate compound, and a molybdate compound. In various embodiments, a corrosion inhibition composition is disclosed comprising a cerium, a tungstate, a silicate compound and a molybdate compound. In various embodiments, a corrosion inhibition composition is disclosed comprising a cerium and a molybdate compound. In various embodiments, a corrosion inhibition composition is provided comprising a zinc oxide, a zinc hydroxide benzoate, a sodium benzoate, a molybdate and a silicate compound. In various embodiments, a corrosion inhibition composition is provided comprising a zinc oxide, a zinc phosphate, a calcium silicate, an aluminum phosphate, a zinc calcium strontium aluminum orthophosphate silicate hydrate, a molybdate, and a silicate compound.

BRIEF DESCRIPTION OF THE DRAWINGS

FIG. 6 illustrates a method of application of corrosion inhibition compositions in accordance with various embodiments.

DETAILED DESCRIPTION

Figure 1A:
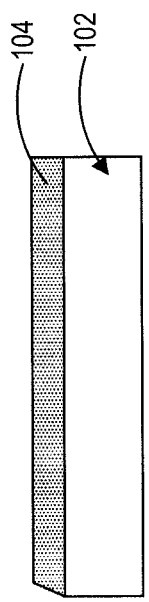
FIGS. 1A and 1B illustrate a corrosion inhibition composition coated on substrates in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Corrosion inhibition compositions used on metal and metal coated substrates are important to many industries. For example, aircraft landing gear often contain metal coated substrates in landing gear and other components, such as bushings. Metal coated substrates are also used in other contexts, such as in other vehicles such automobiles, trains, and heavy equipment. In addition, metal coated substrates are found in construction contexts.

As used herein, a "substrate" may include any metal and/or metal coated material. For example, a substrate may comprise iron, coated iron, steel, coated steel, stainless steel, coated stainless steel, nickel, coated nickel, aluminum, coated aluminum, bronze, coated bronze, and copper beryllium, coated copper beryllium, zinc and/or coated zinc. In various embodiments, stainless steel may comprise a high strength stainless steel such as 15-5PH. In various embodiments, a substrate may comprise a chromium-nickel-tungsten martensitic alloy (also known as Greek Ascoloy). In various embodiments, steel may comprise a high strength low-alloy steel such as 4340 or 300M. In various embodiments, a substrate may comprise a metal that is coated with another material. A coating may be applied by electroplating, cold spraying or other suitable methods. Coatings may comprise one or more metals, such as nickel (Ni), zinc (Zn), cadmium (Cd), titanium (Ti) and combinations thereof. For example, in various embodiments, a substrate may comprise a coated low alloy steel (e.g., 300M steel) comprising a Zn—Ni coating. In various embodiments, a substrate may comprise a coated steel comprising a Cd and/or a TiCd coating, optionally chromate conversion top-coated overcoat. In various embodiments, a substrate may comprise a zinc alloy and/or a TCP (trivalent chromium process (Trivalent Cr coating process) coated zinc alloy. In various embodiments, a substrate may comprise bare steel and/or bare stainless steel. In various embodiments, a substrate may comprise aluminum-nickel-bronze alloys and/or copper alloys. In various embodiments, a substrate may comprise aluminum and aluminum alloys.

White rust is a form of corrosion product that may affect substrates comprising zinc. For example, white rust may affect bare zinc and/or metals coated with zinc containing materials, such as Zn—Ni coated or plated steel, since the former functions as a sacrificial coating that protects a steel substrate from corroding. Exposure to water and carbon dioxide may cause zinc oxide and/or zinc hydroxide to form, which may be referred to as white rust, eventually leaving the steel substrate unprotected against corrosion. To aid in preventing this form of corrosion and/or to promote surface passivation, among other things, it may be beneficial to coat a substrate with a corrosion inhibition composition. This corrosion inhibiting composition may also protect the substrate at scratched or damaged areas, and/or areas where the sacrificial coating has failed.

A corrosion inhibition composition may comprise one or more materials that inhibit at least one form of corrosion of a substrate and/or promote surface passivation of a substrate. In various embodiments, a corrosion inhibition composition may comprise one of more constituent species that may be referred to as pigments or corrosion inhibition constituents. In various embodiments, the corrosion inhibition constituents may combine in a synergistic manner to help prevent corrosion of a substrate and/or promote surface passivation of a substrate.

A corrosion inhibition composition may be mixed with an application vehicle to aid the application of the corrosion inhibition composition to a substrate. An application vehicle may be one or more materials that aid in the dispersing and/or application of a corrosion inhibition composition to a substrate. For example, an application vehicle may comprise an organic resin matrix. In various embodiments, organic resin matrices used as application vehicles include one or more of an epoxy, a polyurethane, an alkyd, a polysulfide, a silicone, an acrylic, or butadiene. In that regard, the corrosion inhibition composition, and/or a smart release adjunct, as described herein, may be referred to as a corrosion inhibition organic coating.

As further described herein, the efficacy of the use of molybdates as corrosion inhibition constituents is related to the solubility of molybdate. The higher solubility, the better inhibition molybdates tend to offer. However, using a high solubility of molybdate in corrosion inhibition organic coatings may produce other issues in corrosion inhibition organic coating application, such as formation of blistering, or a lack of long-term corrosion protection performance. In addition, it is beneficial for a corrosion inhibition organic coating to have a poorly soluble corrosion inhibition composition. Thus, a sparingly soluble corrosion inhibition composition may be beneficial. For example, in accordance with various embodiments, a corrosion inhibition composition may have a solubility of between 0.1 and 20 millimolar (mM) (where 1 mM=$10^{-3}$ mol/L), between 0.5 mM and 15 mM, and between 1 mM and 10 mM.

In that regard, a smart release adjunct may be used to enhance molybdate solubility in corrosion inhibition compositions that contain molybdate. A smart release adjunct may be any material that regulates the solubility of molybdate.

In various embodiments, a corrosion inhibition composition may regulate the corrosion current of a substrate in sodium chloride solution to values at or below those achieved with a saturated strontium chromate solution, with or without the presence of dissolved oxygen. In addition, a corrosion inhibition composition may maintain an open circuit potential (OCP) relationship of steel greater than Cd, TiCd, and plated Zn alloys and/or maintain a corrosion current of Cd, TiCd and Zn alloy plating greater than steel. The present inventors have found that substances such as silicate, molybdate and tungstate compounds tend to inhibit corrosion while elevating the open circuit potential of metals to differing degrees. The present inventors have also found that compounds such as rare earth metal cations, zinc phosphate and benzoate compounds inhibit corrosion while depressing the open circuit potential. In addition, corrosion inhibition compositions and corrosion inhibition organic coatings, in accordance with various embodiments, tend to preserve the galvanic relationship between zinc nickel and steel, where zinc nickel is sacrificial to steel, where the substrate is steel coated with (e.g., plated with) zinc nickel.

A corrosion inhibition composition may, in various embodiments, comprise a cerium, a silicate compound, and a molybdate compound. As used herein, a molybdate is a compound that contains an oxide of molybdenum. In various embodiments, the molybdate compound is $ZnMoO_4$ and/or $CaMoO_4$. In various embodiments, the cerium comprises between 10% and 90% by weight (% wt) of the corrosion inhibition composition. As used herein, the term "% wt" or "% by weight," used in reference to a corrosion inhibition composition, may refer to the percentage weight of a corrosion inhibition constituent or a group of corrosion inhibition constituents over the weight of the entire corrosion inhibition composition. For the avoidance of doubt, the weight of the entire corrosion inhibition composition in % wt does not include the weight of any application vehicle and/or smart release adjunct used in a corrosion inhibition organic coating. In various embodiments, molybdate compound (e.g., $ZnMoO_4$) comprises between 10% and 90% by weight of the corrosion inhibition composition. In various embodiments, the cerium comprises 50% by weight of the corrosion inhibition composition and the molybdate compound (e.g., $ZnMoO_4$) comprises 50% by weight of the corrosion inhibition composition. A corrosion inhibition composition may, in various embodiments, comprise a cerium and a molybdate compound. In a various embodiments, cerium and molybdate compounds each comprise 50% by weight of the corrosion inhibition composition.

A corrosion inhibition composition may, in various embodiments, comprise a cerium, a tungstate, a molybdate, and a silicate compound. As used herein, a tungstate is a compound that contains an oxide of tungsten. In various embodiments, the molybdate compound is at least one of $ZnMoO_4$, $CaMoO_4$, or $MgMoO_4$. In various embodiments, the silicate compound is at least one of $MgSiO_3$, $ZnSiO_3$, or $CaSiO_3$. In various embodiments, the cerium and the tungstate, collectively or individually, comprise between 10% and 90% by weight of the corrosion inhibition composition. In various embodiments, molybdate compound (e.g., $ZnMoO_4$) comprises between 10% and 90% by weight of the corrosion inhibition composition. In various embodiments, the silicate compound (e.g., $MgSiO_3$) comprises between 10% and 90% by weight of the corrosion inhibition composition. In various embodiments, the cerium and/or the tungstate, collectively or individually, comprise 33% by weight of the corrosion inhibition composition, the molybdate (e.g., $ZnMoO_4$) compound comprises 33% by weight of the corrosion inhibition composition and the silicate (e.g., $MgSiO_3$) compound comprises 33% by weight of the corrosion inhibition composition. In various embodiments, the cerium, the molybdabate and the silicate each comprise 33% by weight of the corrosion inhibition composition.

A corrosion inhibition composition may, in various embodiments, comprise a zinc oxide, a zinc hydroxide benzoate, a sodium benzoate, a molybdate and a silicate compound. In various embodiments, the molybdate compound is $ZnMoO_4$, $CaMoO_4$, or $MgMoO_4$. In various embodiments, the silicate compound is at least one of $MgSiO_3$, $ZnSiO_3$, or $CaSiO_3$. In various embodiments, the zinc oxide, the zinc hydroxide benzoate, and the sodium benzoate, collectively, comprise between 10% and 90% by weight of the corrosion inhibition composition. In various embodiments, molybdate compound comprises between 10% and 90% by weight of the corrosion inhibition composition. In various embodiments, the silicate compound comprises between 10% and 90% by weight of the corrosion inhibition composition. In various embodiments, the zinc oxide, the zinc hydroxide benzoate, and the sodium benzoate, collectively, comprise 33% by weight of the corrosion inhibition composition, the molybdate compound comprises 33% by weight of the corrosion inhibition composition and the silicate compound comprises 33% by weight of the corrosion inhibition composition.

A corrosion inhibition composition may, in various embodiments, comprise a zinc oxide, a zinc phosphate, a calcium silicate, an aluminum phosphate, a zinc calcium strontium aluminum orthophosphate silicate hydrate, a molybdate, and a silicate compound. In various embodiments, the molybdate compound is $ZnMoO_4$, $CaMoO_4$, or $MgMoO_4$. In various embodiments, the silicate compound is at least one of $MgSiO_3$, $ZnSiO_3$, or $CaSiO_3$. In various embodiments, the zinc oxide, the zinc phosphate, the calcium silicate, the aluminum phosphate, and the zinc calcium strontium aluminum orthophosphate silicate hydrate, collectively, comprise between 10% and 90% by weight of the corrosion inhibition composition. In various embodiments, molybdate compound comprises between 10% and 90% by weight of the corrosion inhibition composition. In various embodiments, the silicate compound comprises between 10% and 90% by weight of the corrosion inhibition composition. In various embodiments, zinc oxide, the zinc phosphate, the calcium silicate, the aluminum phosphate, and the zinc calcium strontium aluminum orthophosphate silicate hydrate, collectively, comprise 33% by weight of the corrosion inhibition composition, the molybdate compound comprises 33% by weight of the corrosion inhibition composition and the silicate compound comprises 33% by weight of the corrosion inhibition composition.

Figure 1B:
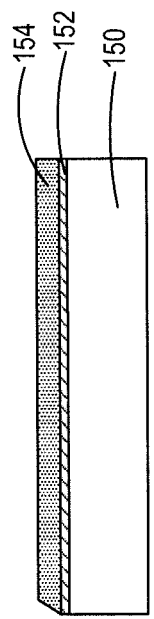

With reference to FIG. 1A, substrate 102 is shown coated with corrosion inhibition composition 104. With reference to FIG. 1B, substrate 150 is shown having coating 152. Coating 152 may comprise Zn and Ni. Substrate 150 is also shown coated with corrosion inhibition composition 154.

Figure 2:
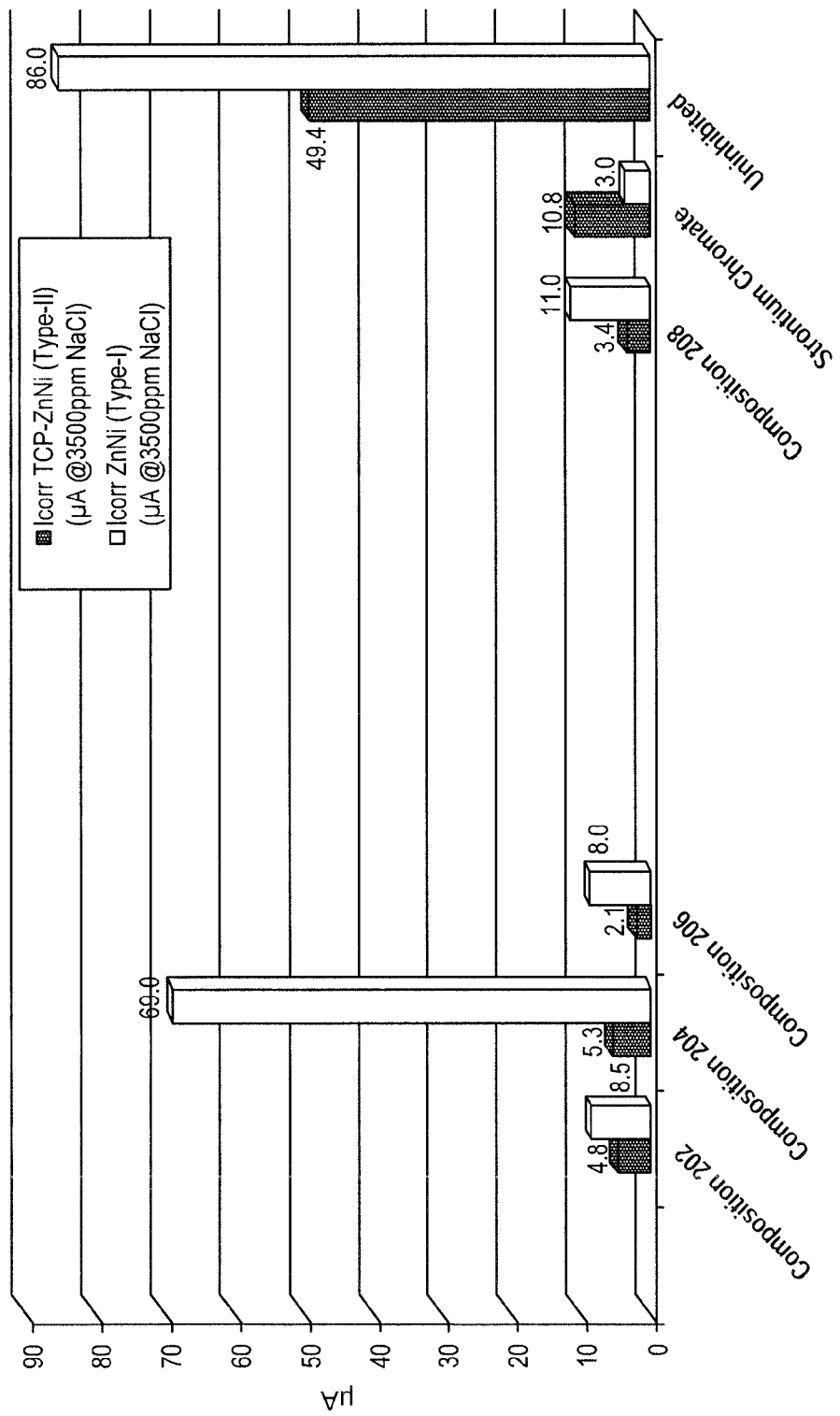
FIG. 2 illustrates inhibition data of various materials, including those of corrosion inhibition compositions in accordance with various embodiments.

Surprisingly, certain corrosion inhibition compositions demonstrated a synergetic effect. With reference to FIG. 2, results of a screening test are shown. Testing was performed on a number of corrosion inhibition compositions. Corrosion current between substrate electrodes of the same size was measured in the inhibited electrolyte under an externally imposed potential difference ranging between larger than 0 mV and 200 mV. Corrosion inhibition compositions were screened for inhibition by comparing steady state corrosion current at inhibitor saturation level in a typical electrolyte (e.g. 3500 ppm NaCl) versus the un-inhibited electrolyte control and the chromated inhibitor baseline (e.g. $SrCrO_4$).

The x axis of FIG. 2 shows the type of corrosion inhibition composition tested. Each corrosion inhibition composition tested was tested on TCP-ZnNi-plated steel (left bar) and ZnNi-plated steel (right bar). The y axis shows the current measured in µA. As shown, a composition consisting of a molybdate compound and a silicate compound is shown as corrosion inhibition composition 202. A composition consisting of a zinc oxide, a zinc hydroxide benzoate, and a sodium benzoate is shown as composition 204. A composition comprising a zinc oxide, a zinc hydroxide benzoate, a sodium benzoate, a molybdate and a silicate compound is shown as composition 206. As illustrated, the current exhibited by composition 206 is lower than what would have been expected by additively combining composition 202 and composition 204.

Also as shown, a composition comprising a cerium, a molybdate and a silicate compound is shown as composition 208.

Inhibition level measurements were taken over TCP/ZnNi-plated steel, ZnNi-plated steel, bare steel, and CCC/Cd-plated steel substrates. The below table summarizes the results in TABLE 1.

TABLE 1

| Pigment Blend Formulation (equal wt parts each) | Icorrosion and Igalvanic (µA/cm$^2$) for different Substrates | | | |
|---|---|---|---|---|
| | TCP/ZnNi | ZnNi | Bare Steel | CCC/Cd |
| cerium and molybdate | 0.06 | 0.2-0.3 | 1-2 | 4-5 |
| | ~0 | 1-2 | — | 6-7 |
| cerium, molybdate and silicate | 0.04-0.05 | 0.1-0.2 | 3-4 | 6-7 |
| | 1-2 | 5-6 | — | ~20 |
| zinc oxide, zinc hydroxide benzoate, sodium benzoate, molybdate and silicate | 0.03-0.04 | 0.6-0.7 | 1-2 | 5-6 |
| | ~2 | 5-6 | — | ~20 |
| zinc oxide, zinc phosphate, calcium silicate, aluminum phosphate, zinc calcium strontium aluminum orthophosphate silicate hydrate, molybdate and silicate | 0.03-0.04 | 0.7-0.8 | 1-2 | 5-6 |
| | 0.1-0.2 | 2-3 | — | 8-10 |
| Strontium Chromate (baseline) | 0.05 | 0.1-0.2 | 1-2 | 7-10 |
| | 3-4 | ~0.5 | — | ~10 |
| 3500 ppm NaCl (control) | 0.2 | 0.4 | 8-10 | 8-9 |
| | ~70 | ~20 | — | ~40 |

Figure 3:
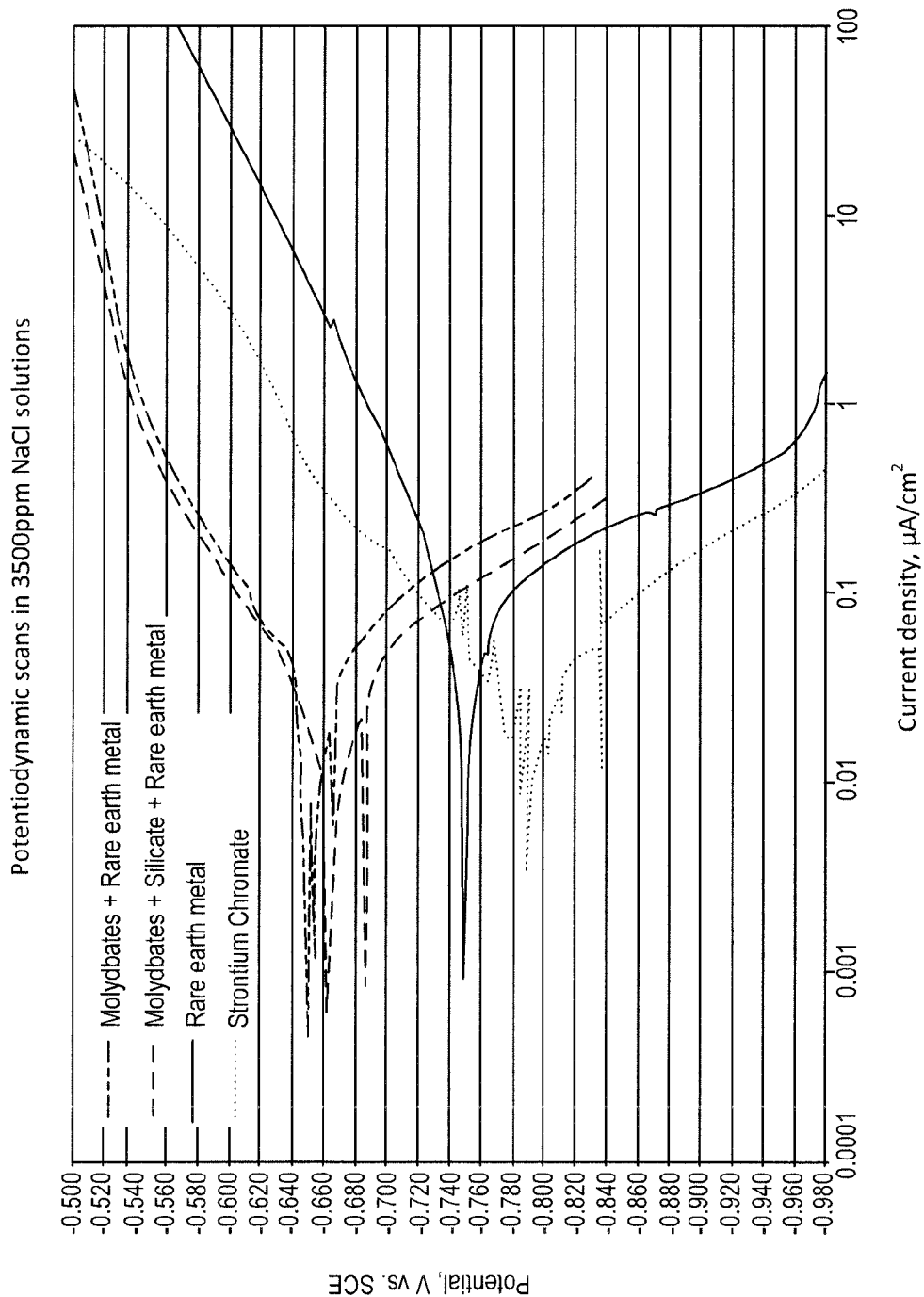
FIG. 3 illustrates potentiodynamic scans of various materials, including those of corrosion inhibition compositions in accordance with various embodiments.

As shown, all corrosion inhibition compositions exhibited similar corrosion rates and similar or lower galvanic corrosion rates compared to strontium chromate on TCP/ZnNi-plated steel substrate, and comparable rates on uncoated ZnNi-plated steel substrate. On CCC/Cd-plated steel substrate all shown corrosion inhibition compositions exhibited similar or comparable corrosion and galvanic corrosion rates compared to strontium chromate. Finally, on bare steel all shown corrosion inhibition compositions exhibited similar corrosion rates compared to strontium chromate. As shown, the corrosion current of the corrosion inhibition compositions is less than or about 0.06 µA/cm$^2$ on a TCP ZnNi-plated steel substrate in 3500 ppm NaCl in water With reference to FIG. 3, potentiodynamic scans are shown. As shown, there is a synergistic effect of combining a rare earth metal compound with at least one of a silicate or a molybdate compounds. An exemplary mixture of a cerium is available commercially under the trademark ECOTUFF from United Technologies Corporation and shown in FIG. 3.

Figure 4:
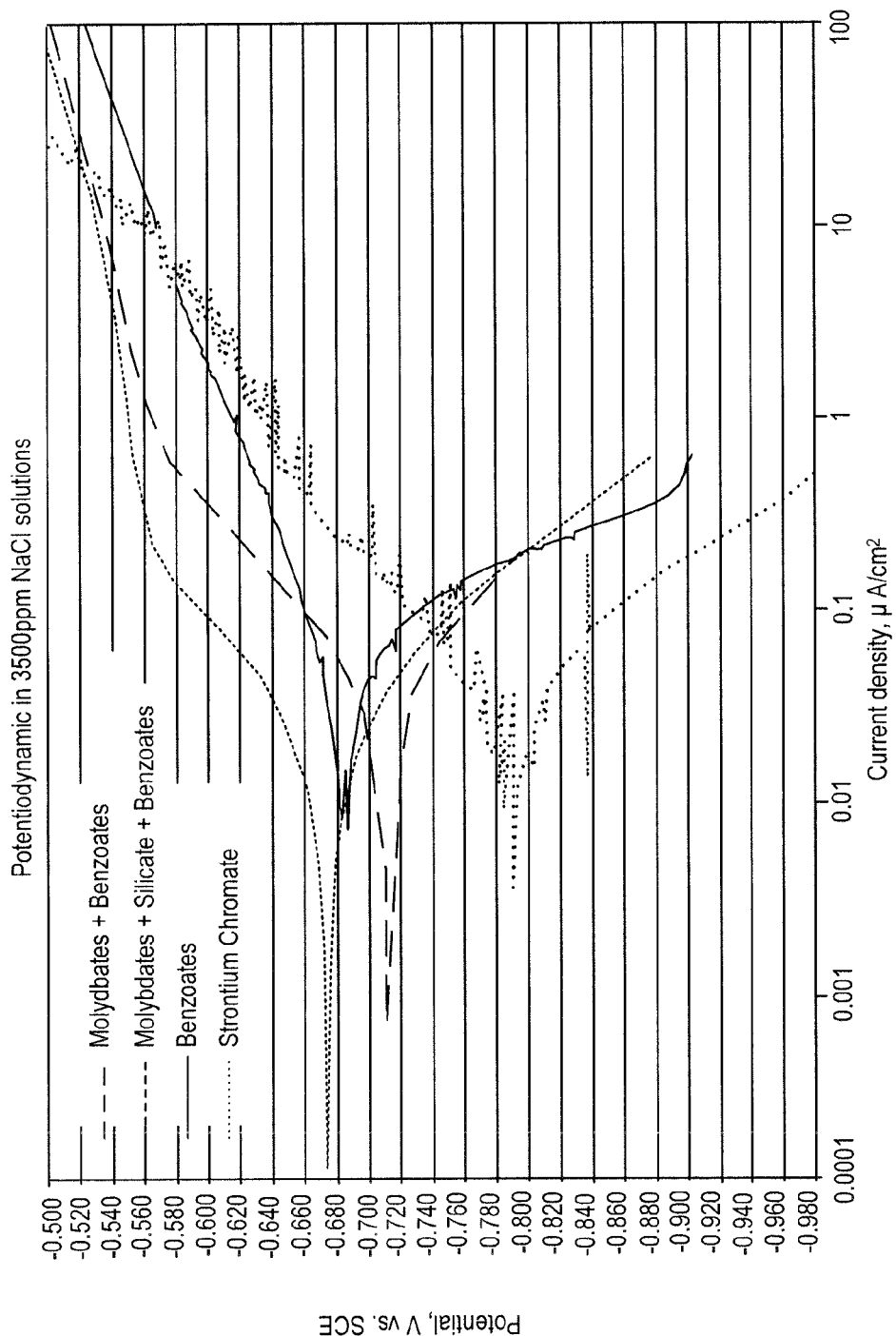
FIG. 4 illustrates potentiodynamic scans of various materials, including those of corrosion inhibition compositions in accordance with various embodiments.

With reference to FIG. 4, potentiodynamic scans are shown. As shown, there is a synergistic effect of combining zinc oxide, a zinc hydroxide benzoate, and a sodium benzoate with at least one of a silicate or a molybdate compounds.

Figure 5:
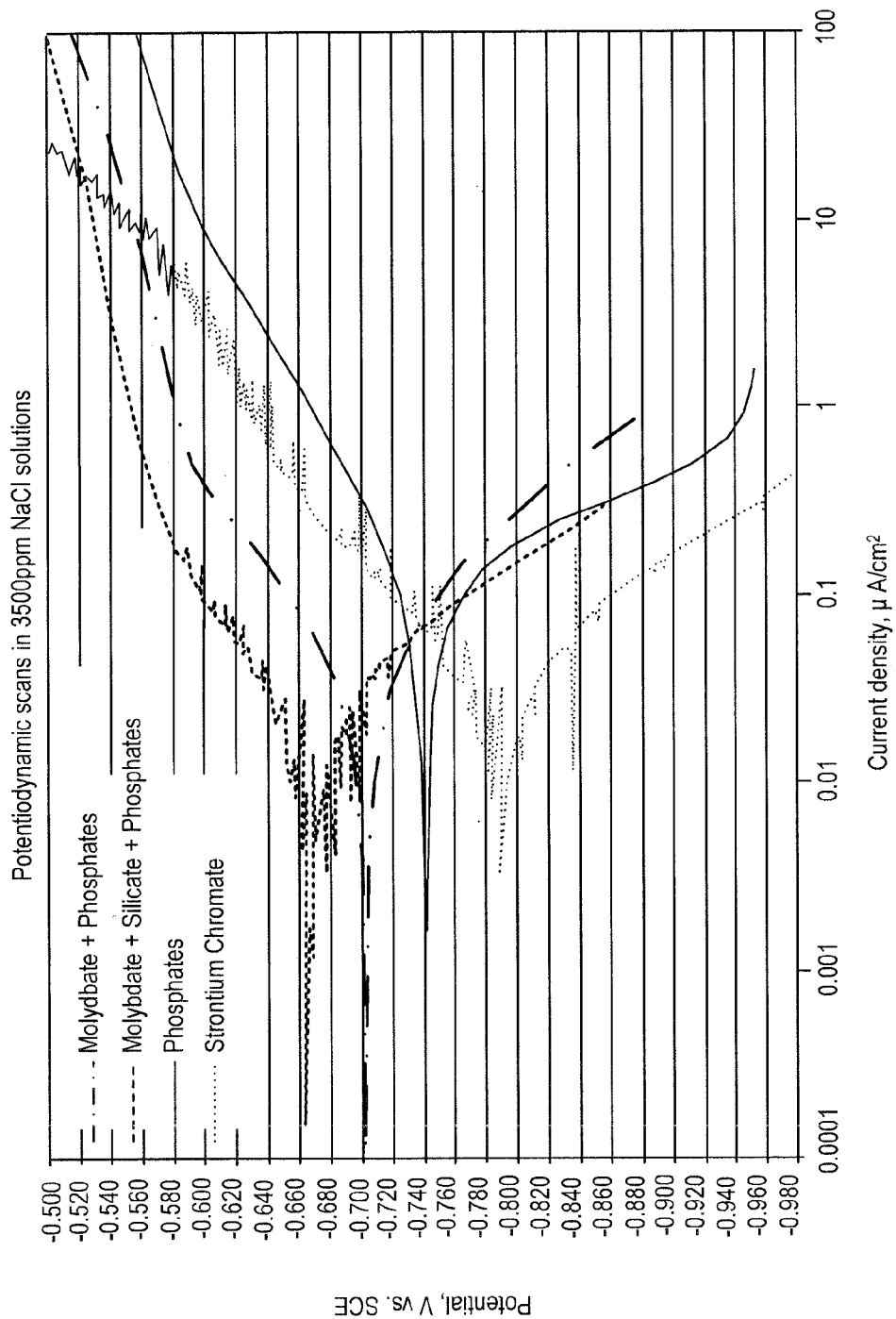
FIG. 5 illustrates potentiodynamic scans of various materials, including those of corrosion inhibition compositions in accordance with various embodiments.

With reference to FIG. 5, potentiodynamic scans are shown. As shown, there is a synergistic effect of combining the zinc oxide, the zinc phosphate, the calcium silicate, the aluminum phosphate, and the zinc calcium strontium aluminum orthophosphate silicate hydrate with at least one of a silicate or a molybdate compounds.

As described above, one or more smart release adjuncts may be used in a corrosion inhibition organic coating. The smart release adjunct aids in the solubility of the corrosion inhibition composition.

In various embodiments, a complexing agent (e.g., nicotinic acid or a salt of nicotinic acid) is used as smart release adjunct to increase the solubility of $CaMoO_4$/$CaSiO_3$ pigments.

In various embodiments, an anion (e.g., the oxalate anion $C_2O_4^{2-}$ of $MgC_2O_4^{2-}$) is used as smart release adjunct to react with a targeted cation (e.g, $Ca^{2+}$), forming the lower solubility $CaC_2O_4$ thus increasing the solubility of $CaMoO_4$/$CaSiO_3$ pigments. In various embodiments, a tungstate $WO_4^{2-}$ (e.g. $Na_2WO_4$ or $CaWO_4$) is combined with $SrMoO_4$ pigment forming the lower solubility $SrWO_4$ thus increasing the solubility of $SrMoO_4$.

In various embodiments, $MgSiO_3$ combined with $ZnMoO_4$ is used as smart release adjunct with a corrosion inhibition composition that has a high percentage by weight of $MoO_4^{2-}$.

With reference to FIG. 6, method 600 is illustrated. In step 602, one or more smart release adjuncts may be combined with a corrosion inhibition composition and an application vehicle (e.g. organic resin matrix) to form a corrosion inhibition organic coating. In step 604, corrosion inhibition organic coating may be painted or otherwise distributed on a substrate and allowed to dry. For example, a corrosion inhibition organic coating may be applied using a brush and/or roller. A corrosion inhibition organic coating may also be applied by dipping or by spraying. Spraying may involve a pump style paint application system, with or without the use of air, to spray the corrosion inhibition organic coating onto the substrate. In various embodiments, spraying may involve the use of a propellant, such as a volatile hydrocarbon, to pressurize the corrosion inhibition organic coating and propel the corrosion inhibition organic coating onto the substrate. Step 604 may be repeated one or more times to build one or more layers onto the substrate.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A corrosion inhibition composition comprising a cerium material, a silicate compound, a molybdate compound, and a tungstate, wherein the molybdate compound is at least one of $ZnMoO_4$, $CaMoO_4$ and $MgMoO_4$.

2. The corrosion inhibition composition of claim 1, wherein the cerium material and the tungstate are present in a combined amount of between 10% and 90% by weight of the corrosion inhibition composition.

3. The corrosion inhibition composition of claim 1, wherein the silicate compound is present in an amount of between 10% and 90% by weight of the corrosion inhibition composition.

4. The corrosion inhibition composition of claim 1, wherein the molybdate compound is present in an amount of between 10% and 90% by weight of the corrosion inhibition composition.

5. The corrosion inhibition composition of claim 1, wherein the molybdate compound is present in an amount of 33% by weight of the corrosion inhibition composition, the silicate compound is present in an amount of 33% by weight of the corrosion inhibition composition, and the cerium material and the tungstate are present in a combined amount of 33% by weight of the corrosion inhibition composition.

6. The corrosion inhibition composition of claim 1, wherein the silicate compound is at least one of $MgSiO_3$, $ZnSiO_3$ and $CaSiO_3$.

7. The corrosion inhibition composition of claim 1, wherein the corrosion inhibition composition exhibits a corrosion current of less than or about 0.06 $\mu A/cm^2$ on a trivalent chromium process ("TCP") ZnNi-plated steel substrate in water containing 3500 ppm NaCl.

8. The corrosion inhibition composition of claim 1, wherein the corrosion inhibition composition exhibits a corrosion current on steel substrates in water containing 3500 ppm NaCl that is comparable to the corrosion current exhibited by a saturated strontium chromate composition on steel substrates in water containing 3500 ppm NaCl.

9. A coating composition comprising the corrosion inhibition composition of claim 1 combined with an application vehicle, wherein the application vehicle comprises at least one of an epoxy, a polyurethane, an alkyd, a polysulfide, a silicone, an acrylic, and butadiene.

10. The coating composition of claim 9 further comprising a smart release adjunct comprising at least one of nicotinic acid, a salt of nicotinic acid, $MgC_2O_4$, $Na_2WO_4$, $CaWO_4$, and a mixture of $MgSiO_3$ and $ZnMoO_4$.

11. An aircraft landing gear component coated with the corrosion inhibition composition of claim 1.

12. A corrosion inhibition composition comprising a cerium material, a silicate compound, and a molybdate compound, wherein the molybdate compound is present in an amount of 33% by weight of the corrosion inhibition composition, the silicate compound is present in an amount of 33% by weight of the corrosion inhibition composition, and the cerium material is present in an amount of 33% by weight of the corrosion inhibition composition.

13. The corrosion inhibition composition of claim 12, wherein the molybdate compound is at least one of $ZnMoO_4$, $CaMoO_4$ and $MgMoO_4$.

14. The corrosion inhibition composition of claim 12, wherein the silicate compound is at least one of $MgSiO_3$, $ZnSiO_3$ and $CaSiO_3$.

15. The corrosion inhibition composition of claim 12, wherein the corrosion inhibition composition exhibits a corrosion current of less than or about 0.06 $\mu A/cm^2$ on a trivalent chromium process ("TCP") ZnNi-plated steel substrate in water containing 3500 ppm NaCl.

16. The corrosion inhibition composition of claim 12, wherein the corrosion inhibition composition exhibits a corrosion current on steel substrates in water containing 3500 ppm NaCl that is comparable to the corrosion current exhibited by a saturated strontium chromate composition on steel substrates in water containing 3500 ppm NaCl.

17. A coating composition comprising the corrosion inhibition composition of claim 12 combined with an application vehicle, wherein the application vehicle comprises at least one of an epoxy, a polyurethane, an alkyd, a polysulfide, a silicone, an acrylic, and butadiene.

18. The coating composition of claim 17 further comprising a smart release adjunct comprising at least one of nicotinic acid, a salt of nicotinic acid, $MgC_2O_4$, $Na_2WO_4$, $CaWO_4$, and a mixture of $MgSiO_3$ and $ZnMoO_4$.

19. An aircraft landing gear component coated with the corrosion inhibition composition of claim 12.

* * * * *